Figure 9:
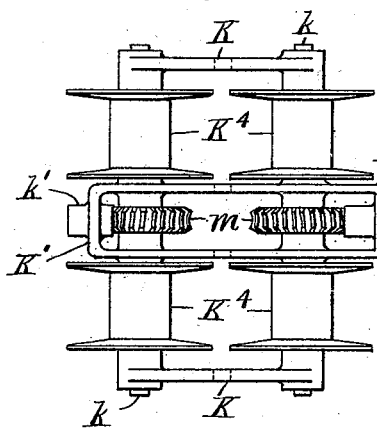

(No Model.) 5 Sheets—Sheet 1.
W. F. BROTHERS.
HOISTING AND TRAVELING CABLE CRANE.
No. 551,613. Patented Dec. 17, 1895.
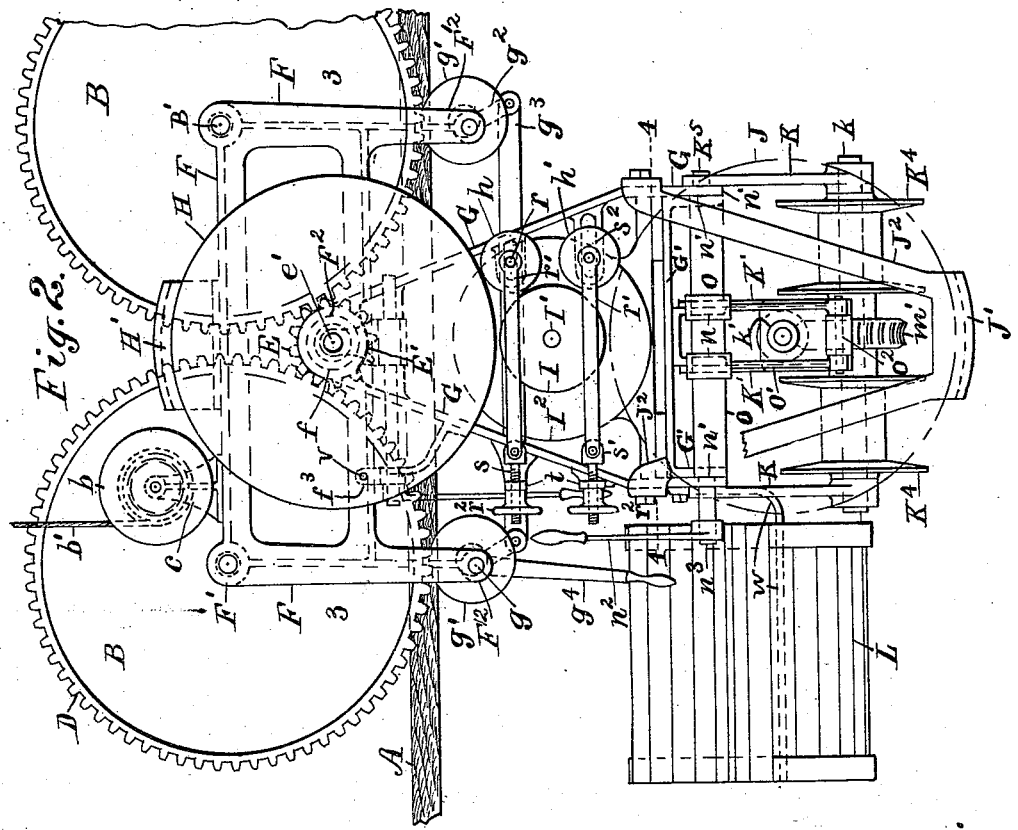
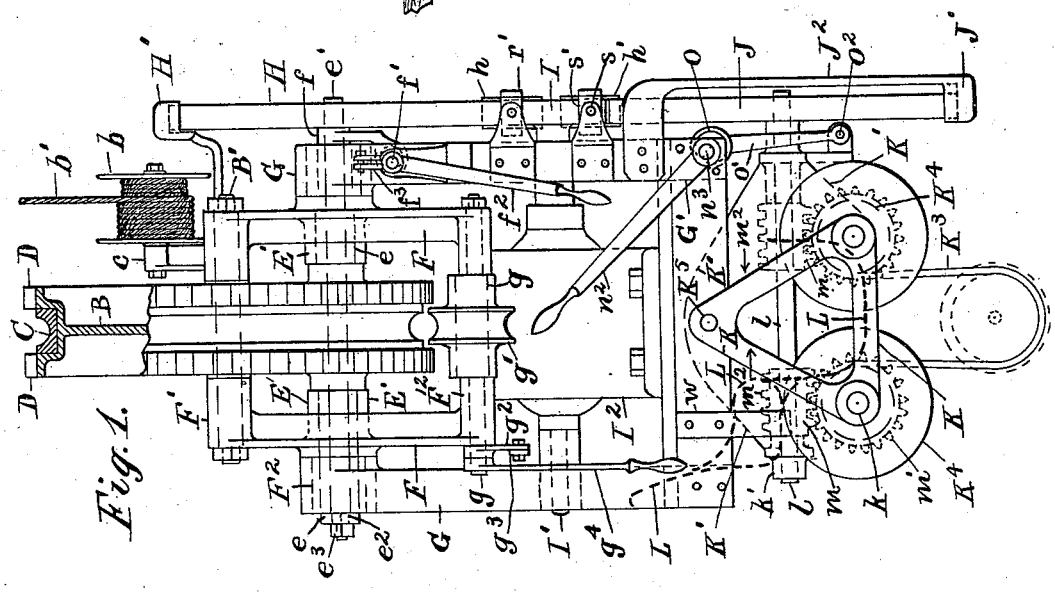
Attest:
L. Lee.
Edw. F. Kinsey.
Inventor.
William F. Brothers,
per Thomas S. Crane, Atty.

(No Model.) 5 Sheets—Sheet 2.
W. F. BROTHERS.
HOISTING AND TRAVELING CABLE CRANE.
No. 551,613. Patented Dec. 17, 1895.
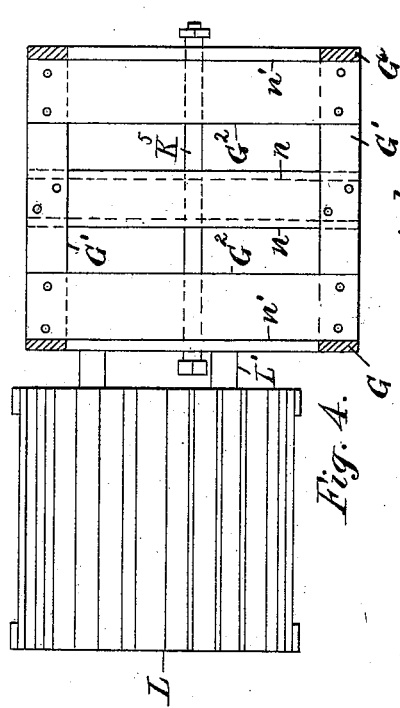
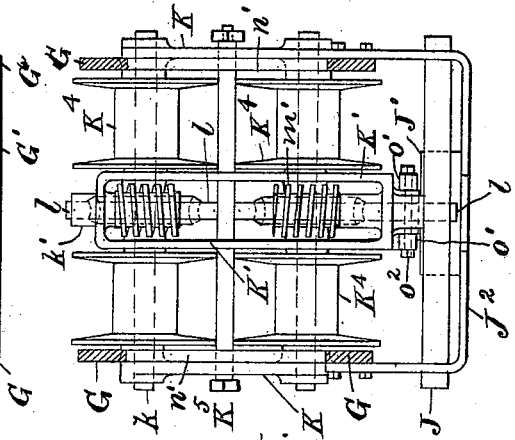
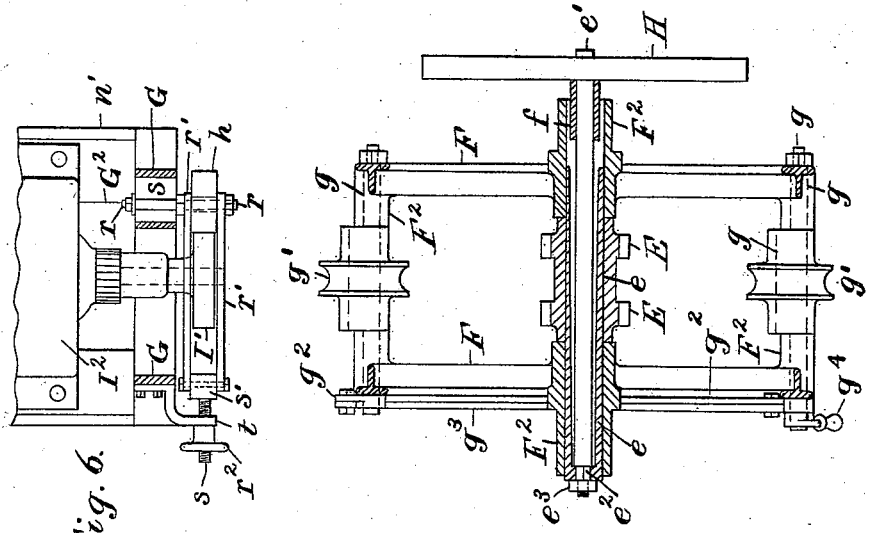
Attest:
L. Lee.
Edw. F. Kinsey.
Inventor
William F. Brothers
per Thomas S. Crane, Atty.

(No Model.) 5 Sheets—Sheet 3.
W. F. BROTHERS.
HOISTING AND TRAVELING CABLE CRANE.
No. 551,613. Patented Dec. 17, 1895.
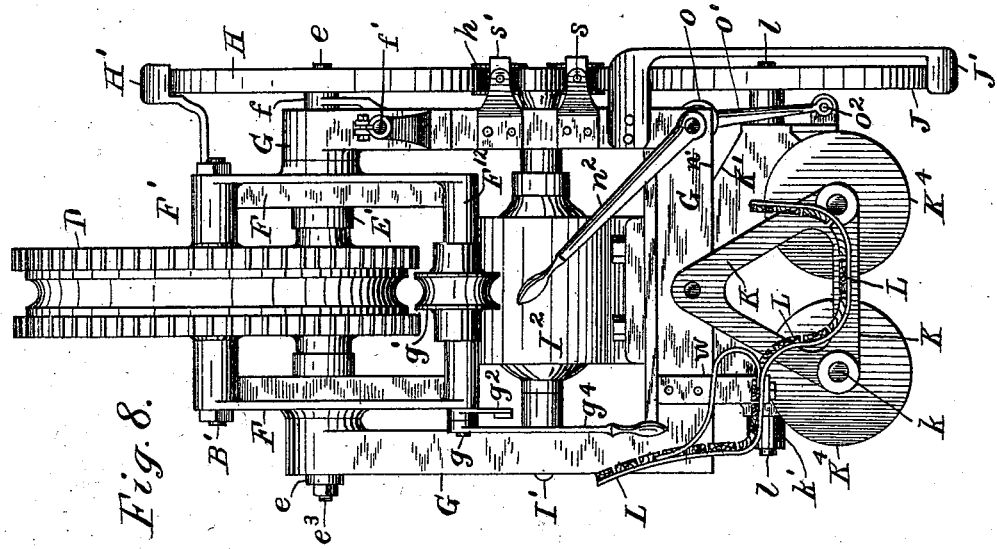
Attest:
A. W. Groom.
Edw. F. Kinsey
Inventor.
William F. Brothers,
per Thomas S. Crane, Atty.

(No Model.) 5 Sheets—Sheet 4.

W. F. BROTHERS.
HOISTING AND TRAVELING CABLE CRANE.

No. 551,613. Patented Dec. 17, 1895.

Attest:
A. W. Crom
Edw. F. Kinsey

Inventor.
William F. Brothers,
per Thomas S. Crane, Atty.

(No Model.) 5 Sheets—Sheet 5.

W. F. BROTHERS.
HOISTING AND TRAVELING CABLE CRANE.

No. 551,613. Patented Dec. 17, 1895.

Attest:
L. Lee,
Edw. F. Kinsey

Inventor
William F. Brothers,
per Thomas S. Crane, Atty.

UNITED STATES PATENT OFFICE.

WILLIAM F. BROTHERS, OF BROOKLYN, NEW YORK, ASSIGNOR TO SARAH E. BROTHERS, OF SAME PLACE, AND MARIA A. BROWN, OF PLAINFIELD, NEW JERSEY.

HOISTING AND TRAVELING CABLE-CRANE.

SPECIFICATION forming part of Letters Patent No. 551,613, dated December 17, 1895.

Application filed July 18, 1895. Serial No. 556,326. (No model.)

*To all whom it may concern:*

Be it known that I, WILLIAM F. BROTHERS, a citizen of the United States, residing at Brooklyn, Kings county, New York, have invented certain new and useful Improvements in Hoisting and Traveling Cable-Cranes, fully described and represented in the following specification and the accompanying drawings, forming a part of the same.

This invention relates to such carriers for cable-cranes as are suspended upon a cable and propelled by an electric motor, with suitable gearing upon the carrier to connect the motor with the driving-wheels upon the cable, and suitable hoisting mechanism connected by gearing with the motor to raise and lower a load suspended from the carrier.

The improvements consist, partly, in means for enabling the driving-wheels to grip the cable upon which the carrier is suspended, and thus obtain the desired amount of tractive force, partly in means for maintaining the vertical position of the carrier when the truck-frame is tipped by the curve or angle of the cable, partly in an improved means of reversing the rotations of the driving-wheels and hoisting-drum, partly in means for automatically applying brakes to the driving-wheels or hoisting-drum when disconnected from the motor, and partly in a means for attaching the hoisting mechanism pivotally upon the carrier to oscillate the same for actuating its gearing.

The drawings illustrate the invention partly in connected views, as in Figures 1, 2, 7 and 8, and partly in sectional plans and detail drawings in the remainder of the figures. Figs. 1 and 2 show in dotted lines the parts which are obscured by others, and are not therefore shaded, while Figs. 7 and 8 do not show any parts in dotted lines, and are therefore shaded to show the true forms of the parts. Figs. 1 and 2 show all the parts in their proper relation, while certain parts are omitted from the other figures to expose more important parts.

The invention will be understood by reference to the annexed drawings, in which—

Figure 11:
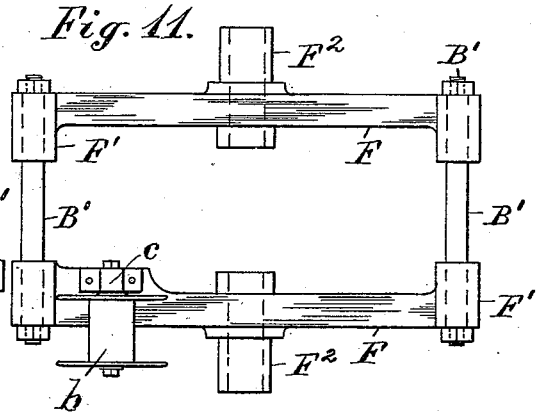
Figure 10:
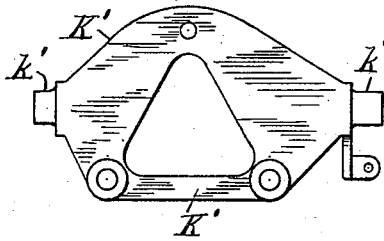
Figure 12:
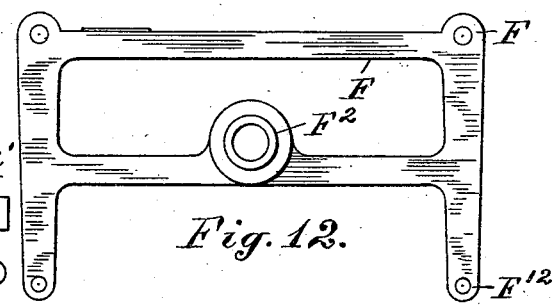
Figure 13:
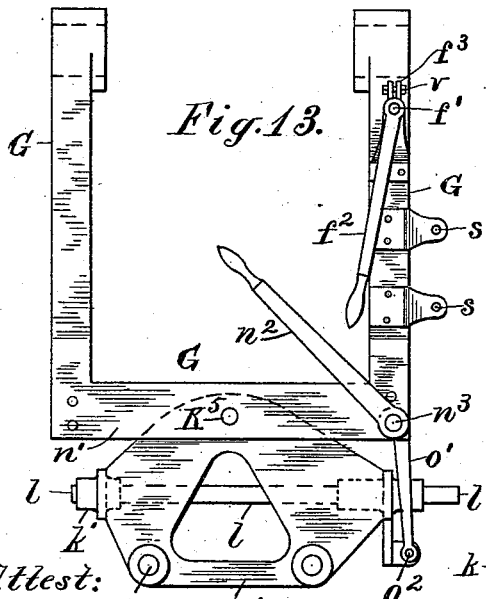
Figure 14:
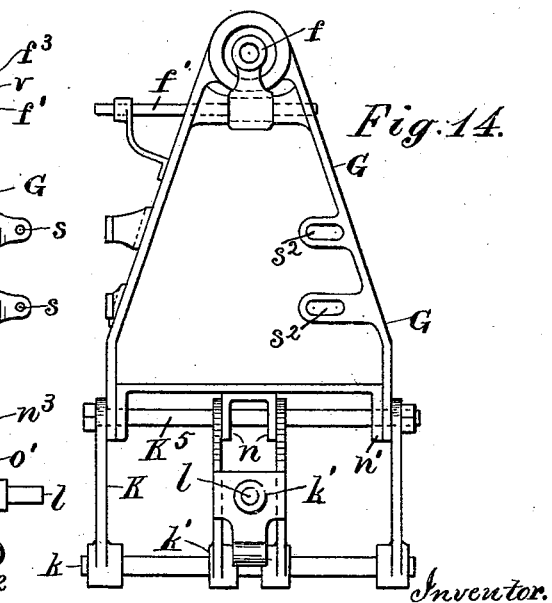
Figure 15:
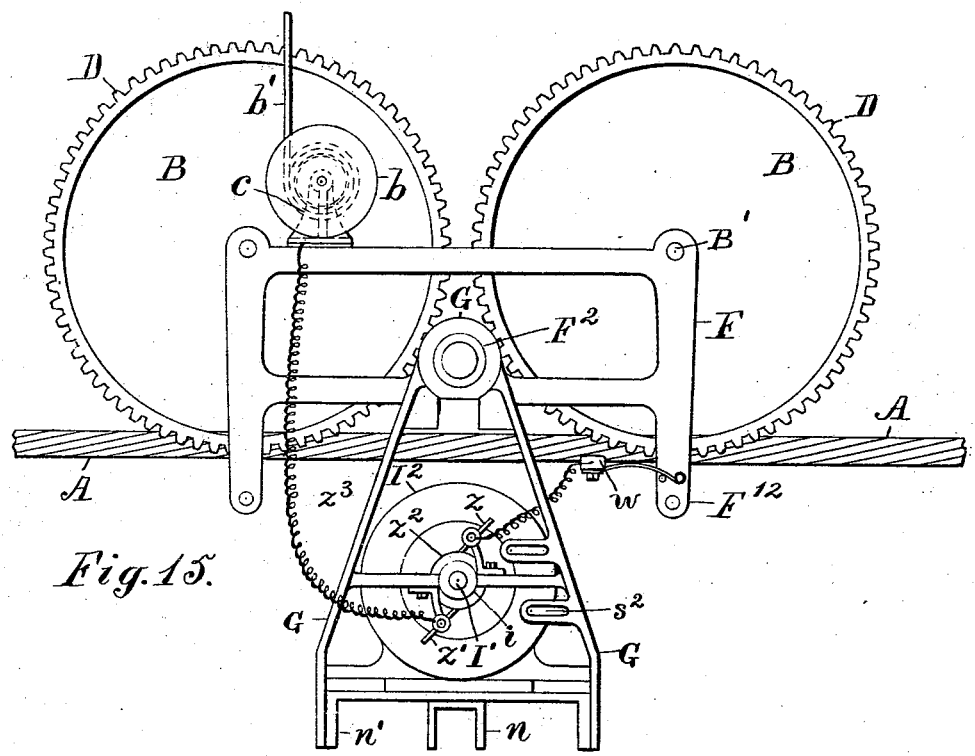
Figure 16:
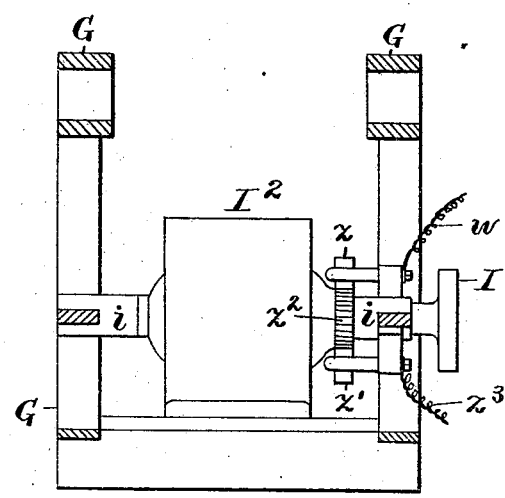

Fig. 1 is an edge view of the carrier with one of the driving-wheels shown partly in section where hatched; Fig. 2, a side view or elevation of the same; and Fig. 3, a plan of the truck-frame in section where hatched, on line 3 3 in Fig. 2, with the driving-wheels and carrier-frame removed, showing the connection of the driving-pinion with the friction driving-wheel and the connections for actuating the grip-wheels. Fig. 4 is a plan of the carrier-frame on line 4 4 in Fig. 2, and Fig. 5 is a plan of the hoisting devices with the side bars of the carrier-frame to which they are pivoted and the brake for the hoister friction-wheel. Fig. 6 is a plan of the side of the carrier-frame where the friction-wheel I' of the electric motor is located, the frame G being shown in section through the slot $s^2$ just above the armature-shaft and the parts on the left of such slot being shown in plan. Fig. 7 is a plan of the principal parts of the apparatus, excepting the drum $b$. Fig. 8 is a side elevation of the principal parts of the apparatus, both figures being shaded. Figs. 9 to 14 exhibit elevations of the principal details of the apparatus, Fig. 9 showing the hoisting-drums with their shafts and worm-wheels and the frames K and K' which support said shafts. Fig. 10 is a side elevation of the central hoister-frame K'. Fig. 11 is a plan of the truck-frame F with the spring-drum $b$ thereon. Fig. 12 is a side elevation of the truck-frame with the drum omitted. Fig. 13 is a side view of the carrier-frame with the central hoister-frame K', and Fig. 14 is a front view of the carrier-frame with the central hoister-frame K' and the lateral hoister-frames K and the drum-shaft fitted in the bearings of such frames. The shaft $n^3$, handle $n^2$, and links $o'$ for oscillating the hoister-frame are shown in Fig. 13, but are omitted from Fig. 14 to expose the pivot-bolt $K^5$ upon which the hoister-frames are pivoted. A few of the attachments to the carrier-frame are shown in Figs. 13 and 14. Fig. 15 is a side elevation of the truck-frame and carrier-frame with a few of the attached parts to illustrate the electrical connections for the motor. Fig. 16 is an edge view of the carrier-frame with the motor and part of its electrical connections.

A designates a portion of the suspending-cable, and B the body of the driving-wheels having the india-rubber tire C fitted in its periphery and grooved to embrace the cable, with cog-teeth D at each side of the tire, as shown at the upper part of the driving-wheel in Fig. 1. The wheels are provided with axles B′ fitted to bearings F′ upon the truck-frame F. The truck-frame is formed with bearings E′ for the shaft of a driving-pinion E meshing with the cogs upon both the driving-wheels. The frame F is formed at opposite sides with projecting journals F² concentric with the pinion E, and the carrier-frame G is hung upon such journals, so as to maintain a vertical position whatever the angle of the cable. The shaft $e$ of the pinion E is made tubular, and a spindle $e′$ is fitted loosely within the same and attached thereto at one end by a squared shank $e²$ and nut $e³$. Near the opposite end of the spindle, at the outer end of the journal F², a vertically-movable bearing $f$ is fitted to the spindle, and a driving friction-wheel H is attached to the spindle outside the bearing. An eccentric shaft $f′$ is provided to move the bearing vertically, and a hand-lever $f²$ is attached to the shaft to turn the same and press the wheel H downward at pleasure. The eccentric shaft is supported in the frame G below the spindle $e′$ at right angles to the latter, and the eccentric portion of the shaft is fitted to an eye upon the lower end of the bearing $f$, so that the rotation of the shaft by the hand-lever $f²$ moves the bearing $f$ upward and downward and thus presses the driving-wheel $h$ against the brake H′ or against the armature friction-wheel I at pleasure. A split bearing $f³$ is shown applied to the outer end of the shaft $f′$ and provided with a clamp-screw $v$ to adjust the pressure upon the shaft. By lining such bearing with leather a suitable degree of friction may be exerted to retain the shaft in any position in which it is placed by the lever $f²$, and thus hold the wheel $h$ into or out of contact with the wheel I. The shafts actuated by the other hand-levers shown herein may be provided with similar friction-clamps.

Bearings F¹² are attached to the frame F, and eccentric spindles $g$ are fitted to the same, with grip-pulleys $g′$ mounted thereon beneath the centers of the drivers B. Cranks $g²$ are attached to the spindles and connected by link $g³$, and a handle $g⁴$ is provided to oscillate the spindles simultaneously and thus press the grip-wheels upon the under side of the cable to increase the frictional grip of the driving-wheels B when desired.

The carrier-frame G supports an electric motor I², having its armature-shaft I′ provided at the outer end with a friction-wheel I to actuate the friction driving-wheel H.

The hoister is shown with four drums K⁴ mounted upon two drum-shafts $k$, which are journaled in hoister-frames K and K′. These frames are pivoted upon a bolt K⁵ extended through depending flanges $n$ and $n′$ upon the bottom of the carrier-frame G. The outer frames K are shown in Fig. 1 triangular in form and supporting the outer ends of the drum-shafts. The central frame K′ is made of box form with parallel side plates having bearings for the drum-shafts, and bearings $k′$ at its opposite ends for a worm-spindle $l$. The drum-shafts $k$ are provided inside the frame K′ with worm-wheels $m′$, and the shaft $l$ is provided with worms $m$ meshing into the worm-wheels, and upon its outer end with a hoister friction-wheel J to operate with the armature friction-wheel I.

Figs. 9 and 10 show the frame K′ without the shaft $l$, while Fig. 13 shows the frame with the shaft, and Figs. 1, 2, and 5 show all the parts in suitable connection with one another.

The four drums K⁴ are provided with hoist-ropes wound in pairs, as indicated by the line K³ in Fig. 1, a hoisting-sheave being placed in the bight of each rope to support the load, as indicated by dotted lines in Fig. 1. By using four drums and two hoist-ropes the load may be gripped at two points, and its twisting may be prevented during the hoisting operation. Such construction is especially adapted for supporting a life-boat upon the carrier to transport it over the surf and deposit it in the still water beyond, as set forth in my application, Serial No. 556,327, filed July 18, 1895, for improvements in cable-crane with gravity-anchor. A shaft $n³$ is journaled in the flanges $n$ $n′$ and provided with an eccentric $o$ connected by links $o′$ with a pin $o²$ upon the frame K. The shaft is provided with handle $n²$, and a seat or chair L is attached by bracket $w$ to the side of the carrier-frame to carry an operator within reach of such handle and the levers $f²$ and $g⁴$.

The seat L is indicated by a heavy dotted line only in Fig. 1, to avoid obscuring the other parts, but is fully shown in Figs. 2, 4, 7 and 8. The movement of the handle $n²$ serves to oscillate the hoister-frame and press the hoister friction-wheel J against the armature-wheel I when it is desired to rotate the drums for hoisting, and in like manner the lever $f²$ serves, by turning the eccentric-sleeve $f$, to depress the spindle $e′$ and crowd the friction-wheel H against the armature-wheel I when it is desired to rotate the drivers B.

A brake-shoe H′ is fixed upon the frame F and operates, when the wheel H is retracted from the wheel I, to arrest the motion of the drivers by frictional resistance. A brake-shoe J′ is fixed by arms J² to the frame G beneath the hoister-wheel J, and operates upon the wheel J to arrest the hoisting mechanism or to hold the same in a fixed position. By relaxing the pressure upon the handle $n²$ which oscillates the hoister-frame the brake-shoe may release the wheel J in a suitable degree to lower a load at any desired speed. A spring-drum $b$ is pivoted upon a stand $c$ on top of the truck-frame F, and a flexible electric cord $b′$ is wound upon the drum and may have its farther end attached to any fixed source of electricity or to a trolley-wheel running upon a trolley-wire. In the latter case the cord $b′$ would extend upwardly, as shown in Figs. 1 and 2, or at some angle with the cable A, and the spring-drum serves to take up the slack of the electric cord or conductor, as the carrier moves along the cable A, in cases where the trolley-wire is not parallel with such cable, which case is commonly found in practice. Where the electric cord is attached to a fixed support, it would extend substantially parallel with the cable A, and would be of suitable length to permit the desired traverse of the carrier upon the cable. The electric cord is then, by its attachment to the spring-drum, wound and unwound from the drum as the carrier moves in opposite directions upon the cable. The bearings $i$ for the armature-shaft I' are shown in Figs. 15 and 16, with the commutator $z^2$ adjacent to one of the bearings, and the brushes $z$ and $z'$ applied to the commutator, with an electrical connection $z^3$ extended from the brush $z'$ to the bearing $c$ which supports the drum $b$ for the trolley-cord. The bearing $c$ would, in practice, be insulated upon the truck-frame F, and the conductor $b'$ would have its terminal in electrical connection with the drum, so that the current might flow therefrom through the bearing $c$ to the brush $z'$. The other brush $z$ is shown connected by wire $w'$ with a spring-bar $w$ pressed upon the cable A. The india-rubber insulating-tires C upon the driving-wheels insulate the entire apparatus from the cable, and the trolley-wire thus furnishes the direct conductor for the motor, and the cable A the conductor for the return-current. To reverse the movements of the drivers B, I provide an intermediate friction-wheel $h$, which may be pressed between the armature-wheel I and the friction-wheel H when the latter is held intermediate to the wheel I and brake-shoe H'.

The axle of the wheel $h$ is sustained in the ends of links $r'$, and is projected laterally into a slot $s^2$ in the frame G. The links are pinned at their opposite ends to a block $s'$, and a screw $s$ is projected from the block through a bearing upon the carrier-frame G. The screw $s$ connects the block with a rotary hand-nut $r^2$ within reach of the operator, and serves, when desired, to crowd the wheel $h$ between the wheels H and I. When the latter wheels are separated, as shown in Fig. 2, and the wheel H is clear of its brake-shoe, the wheel $h$ transmits the motion of the electric motor in a reverse direction to the drivers B. The slot $s^2$ prevents the displacement of the wheel $h$ when not in operation, but is made loose enough laterally to permit the intermediate wheel $h$ to find its bearings upon the wheels H and I when pressed between the same. The links $r'$ pass upon opposite sides of the armature friction-wheel I, and the block $s'$ and screw $h$ thus lie opposite one edge of the armature-wheel, while the intermediate wheel $h$ or $h'$ is upon the opposite edge of the wheel. By this arrangement the draft of the screw presses the intermediate wheel squarely against the edge of the armature-wheel, and the intermediate wheel does not therefore need any guide or support when in operation. The projection of the axle $r$ loosely within the slot $s^2$, as shown in Figs. 2 and 6, is simply to hold the intermediate wheel approximately in position when it is not in operation. An intermediate wheel $h'$ is similarly arranged to operate with the wheels I and J to drive the hoisting-drums in a reverse direction.

It is obvious that the drum-shafts $k$ could be pivoted directly upon the carrier-frame G, and the end of the worm-shaft $l$ alone be raised and lowered to connect the hoister friction-wheel with the armature-wheel I; but such construction would draw the worms $m$ out of mesh with the wheels $m'$, and for this reason I prefer to mount the hoisting mechanism upon an oscillating frame and move such frame bodily to bring the friction-wheels together. When the central hoister-frame K' is oscillated by the means provided, the outer frames K are oscillated therewith, as they swing loosely upon the pivot-bolt $K^5$, and move freely with the drum-shafts $k$.

I have shown four drums upon the hoister-frame, as such construction enables me to wind four ropes simultaneously, and thus to hold and lift any large object, like a boat, parallel with the axles of the drums; but it is obvious that the hoisting mechanism may be provided with one or two drums only, if preferred. With the use of two drums and a hoisting-pulley in the bight of the rope, the thrust upon the worms may be balanced, as is indicated by the reverse direction of the screw-threads upon the worms $m'$ in Fig. 5.

By forming the carrier-frame G distinct from the truck-frame the latter is enabled to maintain a vertical position when the carrier is moving along an inclined cable, and by forming the journals $F^2$ for the carrier-frame concentric with the driving-pinion E the gearing connecting the motor with such pinion may be located upon the carrier and operate upon the pinion as the carrier swings upon the journals.

As the tension upon the anchorage of a cable is greatly diminished by making the cable slack, it is obvious that such reduction of the tension is accompanied by an increased inclination of the cable near its bearings or supports, and it is therefore important to hinge the carrier-frame to the truck-frame, as shown herein, so as to maintain the carrier-frame in a vertical position when approaching the supports of the cable. As the driving-wheels are liable to slip upon the cable when the latter is thus inclined, the rubber tire in the rims of the drivers is provided, to afford a powerful grip upon the cable, and prevents the driving-wheels from slipping when the carrier is ascending such inclined portions of the cable. By its insertion between the two rows of teeth D upon the driving-wheels the rubber tire is entirely detachable, and may thus be renewed whenever it is worn. By providing cog-teeth at both edges of the rubber tire, and making the pinion E mesh with both, the driving-strain is centralized and the driving-wheels are prevented from twisting laterally under the strain of the driving-pinion. Where the motor upon the carrier is supplied with an electric current by a trolley running upon a trolley-wire, the spring-drum $b$ is of great utility in maintaining a tension upon the electric cord or conductor $b'$, and thus preventing any jerks which are liable to strain the conductor if the slack in the same is suddenly taken up.

Where the carrier is reciprocated through a limited space upon the cable, the electric cord attached at one end to a fixed support, with the other end wound upon the spring-drum, furnishes a far more perfect conductor than a trolley running loosely upon a conducting-wire. The reversing-wheels $h\ h'$ enable me to reverse the motion of the hoisting or driving gears with the addition of a single wheel only for each, and the whole construction thus performs a great many functions with the use of very few parts.

In carriers of this description it has been common to actuate two driving-wheels by a single chain extended from a sprocket-wheel driven by the motor. My construction enables me to avoid the use of chains and to employ "direct gearing," which term may be used to define either the friction-wheels I and H or the cogged wheels D and E. As the tire C drives the carrier along the cable when rotated thereon, it is obviously immaterial whether or not the cog-wheels D be formed in the same casting with the wheel which carries the tire, and I have therefore claimed cog-wheels for rotating the driving-wheels when the truck-frame is provided with intermediate journals and with a pinion to mesh with both of said cog-wheels.

Having thus set forth the nature of my invention, what I claim herein is—

1. In a carrier for cable cranes, the combination, with the truck frame F having two driving wheels B fitted to the cable A, and cog wheels connected with such driving wheels, of the bearings $E'$ upon the truck frame intermediate to the bearings of the driving wheels, the shaft $e$ fitted to such bearings and provided with pinion E meshing with both of such cog wheels, the journals $F^2$ projected from the frame F concentric with the bearings $E'$, and intermediate to the driving wheels, the carrier frame G hung upon such journals and thus jointed to the truck frame by a single pivot, an electric motor mounted upon such carrier frame, gearing connecting the said motor with the pinion E, and electrical connections for operating the motor, the whole arranged and operated as and for the purpose set forth.

2. In a carrier for cable cranes, the combination, with driving wheels resting upon the cable, of a truck frame supported by the same, a driving pinion connected with such wheels and mounted upon said frame, with shaft and journals at the ends, a carrier frame hung upon such journals and an electric motor and hoisting mechanism mounted upon said frame, with gearing for connecting the motor at pleasure with the hoisting mechanism and with the driving pinion, substantially as herein set forth.

3. In a carrier for cable cranes, the combination, with driving wheels resting upon the cable, of a frame supported by the same, a driving pinion mounted upon said frame, an electric motor mounted upon such carrier frame with a friction wheel upon its armature shaft and detachably connected to such driving pinion, a hoisting frame pivoted below the carrier frame and sustaining hoisting mechanism provided with a hoister friction driving wheel, and means for oscillating the hoister frame to press such wheel upon the armature friction wheel, as and for the purpose set forth.

4. In a carrier for cable cranes, the combination, with driving wheels resting upon the cable, of a truck frame supported by the same, a driving pinion connected with such wheels and mounted upon said frame, with shaft and journals at the ends, a carrier frame hung upon such journals, an electric motor mounted upon such carrier frame with an armature friction wheel upon its armature shaft, a friction wheel connected with the said pinion and movable to and from the armature wheel, a hoister frame pivoted to the carrier frame and sustaining hoisting mechanism provided with a hoister friction wheel, and means for oscillating the hoisted frame with its contained mechanism to and from the armature wheel, to impart motion to the hoister friction wheel, substantially as herein set forth.

5. In a carrier for cable cranes, the combination, with driving wheels resting upon the cable, of a frame supported by the same, a driving friction wheel H mounted upon said frame and connected by pinion E with such driving wheels, an electric motor upon such carrier frame with an armature friction wheel upon its armature shaft, hoisting mechanism provided with a hoister friction wheel, means for pressing the driving friction wheel H and the hoister friction wheel at pleasure toward the armature wheel, and stationary brake-shoes upon the framing upon the outer sides of the driving friction wheel and hoister friction wheel adapted to check the same when they are retracted from the armature wheel, substantially as herein set forth.

6. In a carrier for cable cranes, the combination, with driving wheels resting upon the cable, of a frame supported by the same, a friction driving wheel mounted upon said frame and connected with such driving wheels, an electric motor upon such carrier frame with an armature friction wheel upon its armature shaft, means for pressing the friction driving wheel toward the armature wheel to rotate the truck wheels in a given direction, and an intermediate friction wheel with means for pressing it upon the armature wheel and upon the driving friction wheel to reverse the motion of the driving wheels, as herein set forth.

7. In a carrier for cable cranes, the combination, with driving wheels resting upon the cable, of a frame supported by the same, a driving friction wheel mounted upon said frame and connected with such driving wheels, an electric motor upon such carrier frame with an armature friction wheel upon its armature shaft, means for pressing the driving friction wheel toward the armature wheel to rotate the driving wheels in a given direction, and an intermediate friction wheel with means for pressing it between the armature wheel and the driving friction wheel, and a bearing adapting the intermediate wheel to yield laterally, as and for the purpose set forth.

8. In a carrier for cable cranes, the combination, with the carrier frame and an electric motor sustained thereon with suitable electrical connections for operating the same, of two driving wheels resting upon the cable and suitably journaled to support the weight of the carrier, grip pulleys applied to the cable opposite to the driving wheels, and provided with eccentric axles as set forth, cranks and a link for connecting such eccentric axles, and means for actuating the same by hand, substantially as set forth.

In testimony whereof I have hereunto set my hand in the presence of two subscribing witnesses.

WILLIAM F. BROTHERS.

Witnesses:
 L. LEE,
 THOMAS S. CRANE.